United States Patent [19]

Schuler, III

[11] Patent Number: 5,720,616
[45] Date of Patent: Feb. 24, 1998

[54] BRAILLE SIGN AND METHOD OF MANUFACTURE

[76] Inventor: George Schuler, III, 5715 Green Ash, Houston, Tex. 77081

[21] Appl. No.: 771,515

[22] Filed: Dec. 23, 1996

[51] Int. Cl.$^6$ .................................................. G09B 21/02
[52] U.S. Cl. ............................ 434/113; 434/112; 29/525
[58] Field of Search ............................ 434/113, 112, 434/407; 40/596; 29/525, 432, 451

[56] References Cited

U.S. PATENT DOCUMENTS

| | | | |
|---|---|---|---|
| 2,456,155 | 12/1948 | Seaman | 434/113 |
| 5,161,975 | 11/1992 | Andrews | 434/113 |
| 5,245,744 | 9/1993 | Edgerton | 29/525 |
| 5,403,189 | 4/1995 | Edgerton | 434/113 |

*Primary Examiner*—Jeffrey A. Smith
*Attorney, Agent, or Firm*—Kenneth A. Roddy

[57] ABSTRACT

A sign having tactilely discernible braille characters formed of raised hemispherical elements. A sign plate having a planar front surface, planar back surface, and a predetermined thickness has a plurality of holes of predetermined diameter drilled therein or therethrough which are arranged in a pattern corresponding to a braille character. Elongate pin members having a shank portion and a hemispherically rounded head at one end are secured in respective holes so that the pin shank is secured along its length in the respective hole and the hemispherically rounded head protrudes a predetermined height above the sign plate front surface to form a tactile raised hemispherical element of the braille characters. Alternatively pins having a hemispherically rounded end are secured in respective holes substantially along their length with the hemispherically rounded ends protruding a predetermined height above the front surface to form the raised hemispherical elements. In a preferred embodiment, the shank or pin diameter is greater than the hole diameter and is pressed axially into the hole to be frictionally engaged therein. The holes are drilled by a drilling machine controlled by a central processing unit whereby alphanumeric characters typed on a keyboard are translated into corresponding points of braille characters and the drill bit is positioned at each the points and lowered to drill the holes through the sign plate.

18 Claims, 2 Drawing Sheets

BRAILLE SIGN AND METHOD OF MANUFACTURE

BACKGROUND OF THE INVENTION

1. Field of the Invention

This invention relates generally to braille signs and methods of manufacturing braille signs, and more particularly to a braille sign having raised braille characters formed by elongate pins having a raised hemispherical head or end which are firmly secured in the sign surface substantially along their length, and the method of manufacture.

2. Brief Description of the Prior Art

It is well known that braille is a code in which each of the letters and numerals of the conventional arabic alphabet is represented by raised dots corresponding to a particular letter or numeral. The field or "cell" in which a single letter or numeral is represented is a matrix of six dots; three dots high by two dots wide. Federal regulations set forth a uniform standard for the size and spacing of the raised characters in architectural signs wherein the dot diameter is 0.059", the inter-dot horizontal or vertical spacing within a cell is 0.090", the horizontal separation between cells is 0.241", and the vertical separation (line spacing) between cells is 0.359".

Various methods for making the raised dot characters on architectural signs are known in the art. One method is to mold individual raised character sets in a plastic sheet or to impress them in a thin metal plate from the backside. The sheets or plates are then adhered to the sign face. This method is not aesthetically pleasing and the sheets or plates can be removed from the sign face by vandals.

Another method is to photo-etch the raised braille characters wherein a metal plate is coated with a photosensitive emulsion and a film positive or negative is overlayed on the plate and exposed to a light source. The area blocked out by the film remains soft and is washed away to leave the raised characters. This method is labor intensive and requires expensive equipment. If the etched plate is adhered to a sign face, it is not aesthetically pleasing and can also be removed from the sign face by vandals.

Mechanical and electromechanical braille reading machines which utilize movable pins or small spherical balls or beads to form the raised braille characters are known in the art. There are several patents which disclose reading machines of this type.

Chlumsky U.S. Pat. No. 4,586,904 and Chlumsky et al, U.S. Pat. No. 4,714,581 discloses an electro-magnetic tactile braille display having a laminar display carrier with pattern points formed by spherical feeler balls projecting through openings in the top of the display carrier. The feeler balls can be raised to their tangible positions or lowered by moving associated spring loaded locking balls with a locking armature and setting armature disposed on the underside of the display carrier and controlled by the windings of an electromagnet.

Hoffarth, U.S. Pat. No. 4,898,536 discloses a braille reading machine which includes a pattern setter and eraser operated by selector keys on a cover plate above the pattern setter, and a removable character carrier composed of form-fit profiles. Rows of spring-biased pins having undercuts locked by lateral teeth of elastic strips are guided in or between the form-fit profiles. The spring-biased pins are lifted by the pattern setter to project from the top surface of the character carrier which may then be read in place or removed for independent use as a reading board or printing plate, etc. The pattern setter which lifts the pins may include manually operable levers, electromechanical solenoids or electromagnets, or pneumatic cylinders.

Andrews, U.S. Pat. No. 5,161,957 discloses a braille teaching device having a planar base with opposed reading and writing surfaces with a plurality cells comprising an array of six bores corresponding to the location of potential embossed dots in the braille matrix with dowels slidably disposed in each bore. The dowels have reading and writing ends. To simulate the writing of a braille character selected dowels in each cell are plunged through the bores until their writing ends are flush with the writing surface of the base and their opposed reading ends project from the opposed surface. The base is then turned over and the previously "written" braille characters can be "read" by tactilely sensing the projecting reading ends of each previously plunged dowel.

Braille printers which utilize movable pins to emboss raised braille characters in a deformable substrate and braille signs which utilize spherical balls or beads to form the raised braille characters are also known in the art. There are several patents which disclose various devices of this type.

Galarneau, U.S. Pat. Nos. 4,735,516 and 5,209,584 disclose electromechanical devices for forming braille characters for tactile sensation or impressing onto an embossible substrate wherein an array of six spring-biased braille printing pins are contained in a block-like main body of the apparatus. Each pin is movable between a spring-biased normally retracted position beneath the surface of the block and an extended position protruding from the surface. Selected pins are moved to the extended position by the plunger of an electromechanical solenoid which is controlled by a computer central processing unit (CPU) to form the raised braille characters. The pins may be raised to form a series of characters one after another which may be sensed by the fingertips, or may be impressed into an embossible substrate passing over the block.

Edgerton, U.S. Pat. Nos. 5,245,744 and 5,403,189 disclose a method of placing braille letters on a sign wherein a plurality of blind holes of a given depth are drilled into the sign surface using a template corresponding to the pattern of the braille letters and then inserting a spherical ball or bead into each of the blind holes and securing it either by forcing it into the hole or gluing it so that each ball or bead extends partially outward from the blind hole to form a dome a given height above the flat surface of the sign plate. However, this method requires precision drilling of the blind hole of a precise diameter to a precise depth. Another problem with this method is that the ball or bead is only frictionally retained at the point of tangency of its spherical surface with the sides of the blind hole. Often the frictional fit and height of the ball or bead above the surface varies due to differences between its true diameter and the diameter of the hole due to wear of the drill. The frictional fit may also vary depending upon the type of material used for the ball or bead and the sign plate material. As a result, the ball or bead may pop out of the hole or may not project the prescribed height above the surface of the sign plate.

The present invention is distinguished over the prior art in general, and these patents in particular by a sign having tactilely discernible braille characters formed of raised hemispherical elements. A sign plate having a planar front surface, planar back surface, and a predetermined thickness has a plurality of open-ended holes of predetermined diameter drilled therein or therethrough which are arranged in a pattern corresponding to a braille character. Elongate pin members having a shank and a hemispherically rounded head at one end are secured in respective holes so that the pin shank is secured along its length in the respective hole and the hemispherically rounded head protrudes a predetermined height above the sign plate front surface to form a tactile raised hemispherical element of the braille characters. Alternatively pins having a hemispherically rounded end are secured in respective holes substantially along their length with the hemispherically rounded ends protruding a predetermined height above the front surface to form the raised hemispherical elements. In a preferred embodiment, the shank or pin diameter is greater than the hole diameter and is pressed axially into the hole to be frictionally engaged therein. The holes are drilled by a drilling machine controlled by a central processing unit whereby alphanumeric characters typed on a keyboard are translated into corresponding points of braille characters and the drill bit is positioned at each the points and lowered to drill the holes through the sign plate.

SUMMARY OF THE INVENTION

It is therefore an object of the present invention to provide a braille sign having tactilely discernible braille characters formed of raised hemispherical elements.

It is another object of this invention to provide a braille sign having tactilely discernible braille characters formed of elongate pin members having a raised hemispherical head or end which are firmly secured in the sign surface substantially along their length to prevent them from being dislodged or removed.

Another object of this invention is to provide a braille sign having tactilely discernible braille characters formed of raised hemispherical elements wherein the diameter and height of the raised hemispherical surfaces will be consistent and accurate.

Another object of this invention is to provide a method of manufacturing a braille sign having tactilely discernible braille characters formed of raised hemispherical elements.

Another object of this invention is to provide a method of manufacturing a braille sign having tactilely discernible braille characters does not require precision drilling of a blind hole to a precise depth.

A further object of this invention is to provide a method of manufacturing a braille sign having tactilely discernible braille characters formed of raised hemispherical elements wherein the diameter and height of the raised hemispherical surfaces will be consistent and accurate.

A still further object of this invention is to provide a braille sign having tactilely discernible raised braille characters which is simple in construction, inexpensive to manufacture, and aesthetically pleasing.

Other objects of the invention will become apparent from time to time throughout the specification and claims as hereinafter related.

The above noted objects and other objects of the invention are accomplished by the present sign having tactilely discernible braille characters formed of raised hemispherical elements. A sign plate having a planar front surface, planar back surface, and a predetermined thickness has a plurality of holes of predetermined diameter drilled therein or therethrough which extend completely through the plate between its front and back surfaces in a pattern corresponding to a braille character. Elongate pin members having a shank and a hemispherically rounded head at one end are secured in respective holes so that the pin shank is secured along its length in the respective hole and the hemispherically rounded head protrudes a predetermined height above the sign plate front surface to form a tactile raised hemispherical element of the braille characters. Alternatively pins having a hemispherically rounded end are secured in respective holes substantially along their length with the hemispherically rounded ends protruding a predetermined height above the front surface to the raised hemispherical elements. In a preferred embodiment, the shank or pin diameter is greater than the hole diameter and is pressed axially into the hole to be frictionally engaged therein. The holes are drilled by a drilling machine controlled by a central processing unit whereby alphanumeric characters typed on a keyboard are translated into corresponding points of braille characters and the drill bit is positioned at each the points and lowered to drill the holes through the sign plate.

DESCRIPTION OF THE PREFERRED EMBODIMENT

The significant advantages and utilitarian features of the present invention are best understood when compared with conventional prior art methods of forming braille characters in signs. Therefore, a brief discussion of a typical prior art method of forming braille characters in a sign follows.

Figure 1:
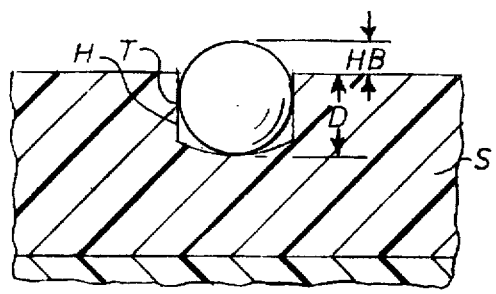
FIG. 1 is a cross section through a portion of a prior art braille cell in a sign wherein the characters are formed by spherical balls or beads installed in blind holes.

FIG. 1 is a cross section through a portion of a cell of a braille character formed in a sign by a prior art method utilizing spherical balls or beads. In this prior art method, a plurality of blind holes H of a precise diameter are drilled a precise depth D into the front surface of a sign plate S and then a spherical ball or bead B is forced into each of the blind holes so that a portion of the ball or bead extends outward from the blind hole to form a dome a given height HB above the flat surface of the sign plate. As discussed previously, this method requires precision drilling a blind hole of a precise diameter to a precise depth, and the ball or bead is only frictionally retained at the point of tangency T of its spherical surface with the sides of the blind hole.

With the prior art blind hole and spherical ball or bead arrangement, the frictional fit and height HB of the ball or bead above the surface often varies due to differences between the true diameter of the ball or bead and the diameter of the hole due to wear of the drill. The frictional fit may also vary depending upon the type of material used for the ball or bead and the sign plate material. As a result, the ball or bead may pop out of the hole or may not project the prescribed height above the surface of the sign plate.

Figure 4:
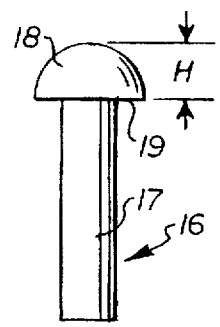
FIG. 4 is side view of a headed braille pin in accordance with the present invention.
Figure 5:
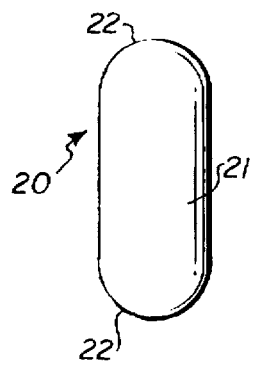
FIG. 5 is side view of a rounded-end braille pin in accordance with the present invention.
Figure 2:
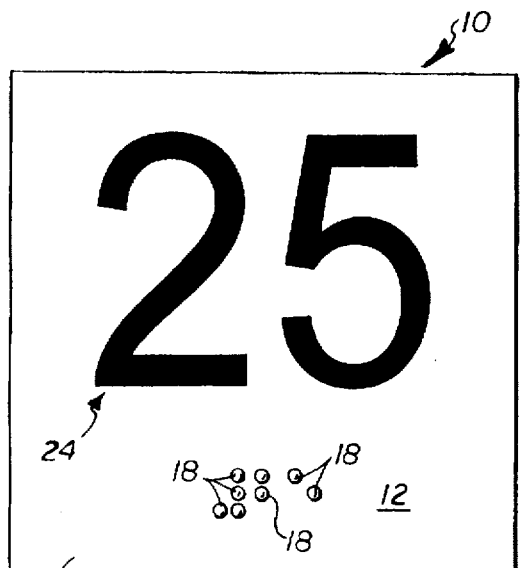
FIG. 2 is a front elevation view of a braille sign apparatus in accordance with the present invention.
Figure 3:
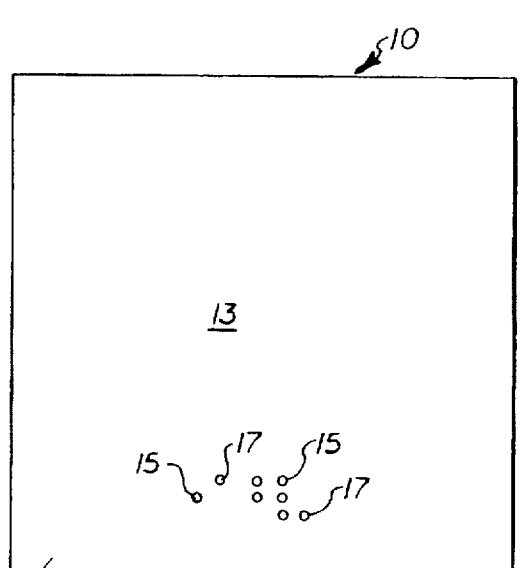
FIG. 3 is a rear elevation of the braille sign of FIG. 2.
Figure 6:
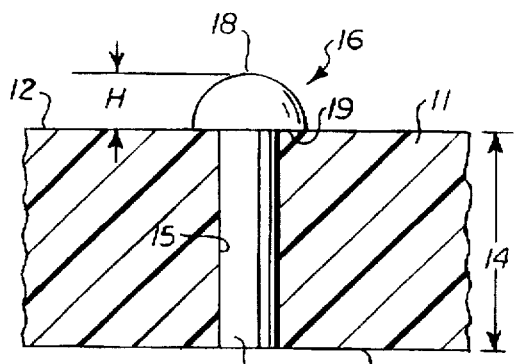
FIG. 6 is a cross section through a portion of a braille letter cell in accordance with the present invention utilizing the pin of FIG. 4.
Figure 7:
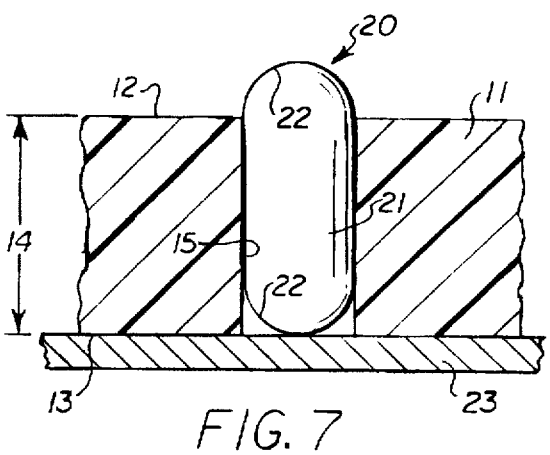
FIG. 7 is a cross section through a portion of a braille letter cell in accordance with the present invention utilizing the pin of FIG. 5.

Referring now to FIGS. 2–7 accordance wigs, a sign 10 in accordance with the present invention is shown if FIGS. 2 and 3. The present sign 10 is made of a sign plate 11 formed of any rigid of semi-rigid material such as metal or plastic. The plate is a planar member having a front surface 12 and a back surface 13 and a thickness 14 (FIGS. 6 and 7). A plurality of holes 15 are formed in the plate 11 and extend completely through the plate between the front and back surfaces 12 and 13 in a pattern corresponding to a braille cell. Alternatively, the holes may be of a depth slightly greater than the shank of the pin elements (described below) to be installed therein.

The braille cell in which a single letter or numeral is represented is a matrix of six points; three vertically spaced points in two laterally spaced columns. The spacing between adjacent points within a cell is 0.090", the lateral spacing between the same points of adjacent cells is 0.241", and the vertical line spacing between the cells is 0.359".

Figure 8:
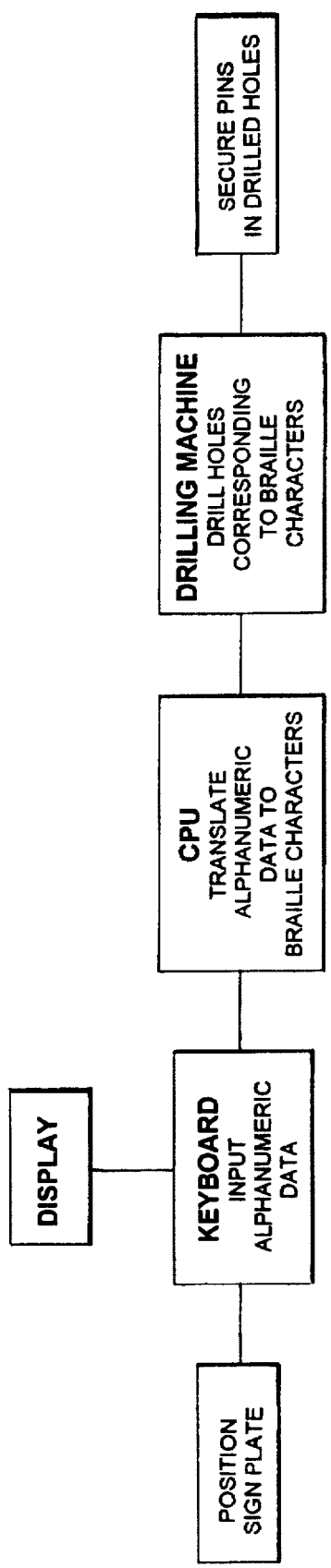
FIG. 8 is a block diagram illustrating the present method of forming braille characters on a sign.

In the preferred method of forming the present sign, illustrated schematically in FIG. 8, the sign plate 11 is secured in a jig beneath an automatic drilling machine. The holes 15 are drilled through (or into) the sign plate 11 by the automatic drilling machine which is controlled by the central processing unit (CPU) of a computer connected with a keyboard, display, and hardware for controlling the drilling machine. The CPU contains a software program that allows the user to type in the desired letters or numerals to be placed on the sign via the keyboard using conventional alphanumeric characters and to adjust their position on the sign plate.

The software program translates the input signals corresponding to the alphanumeric characters into specific points within a braille cell, the points between adjacent cells, and the vertical spacing (line spacing) between the cells corresponding to the braille characters of the input alphanumeric characters. The CPU has a driver output connected with the positioning motor of the automatic drilling machine to move the drill bit to the coordinates of each point in accordance with the instructions from the program and then lower the drill bit upon reaching each point to drill the holes through the sign plate. After the holes have been drilled, the sign plate is removed from the jig.

As shown in FIGS. 4 and 6, a plurality of headed pins 16 are provided to be installed in each drilled hole. The preferred pins are formed of stainless steel, or other suitable hard durable material. Each headed pin 16 has an elongate shank portion 17 of predetermined diameter and a dome-shaped hemispherical head 18 of larger diameter at one end defining a flat radial shoulder 19 therebetween. The headed portion 18 of each pin 16 is approximately 0.059" in diameter and has a height H of approximately 0.0313". The shank 17 of each pin 16 is approximately 0.0278" in diameter. The length of the shank 17 beneath the shoulder 19 is approximately the same length as the thickness 14 of the sign plate 11, or may be slightly longer or shorter. For example, if the plate 11 is ⅛" thick, the length of the shank 17 beneath the shoulder 19 may be 0.120". If the holes are not drilled completely through the sign plate, the length of the shank would be slightly less than the thickness of the sign plate.

The diameter of the holes 15 which are drilled into or through the plate 11 are approximately the same diameter or slightly smaller than the diameter of the shank 17 of the pin 16 to provide a press fit or friction fit. The shanks 17 of the pins 16 are placed above the holes 15 and the pins are pressed or forced axially downwardly frictionally engaging the shank with the interior surface of the holes until the flat shoulder 19 abuts the front surface 12 of the plate 11. Should the bottom end of the shank 17 protrude beneath the bottom of the back surface 13, it may be ground down to be flush with the back surface.

When properly installed, each pin 16 forms a pattern of raised hemispherical dots corresponding to the pattern of the braille characters with each raised hemispherical surface having a diameter of approximately 0.059" and a height above the flat surface of approximately 0.0313".

One advantage of the present headed pin and hole arrangement is that the pin shank 17 is frictionally engaged in the hole 15 along its entire length, cannot be easily removed, and will not pop out of the sign surface as sometimes happens with frictionally engaged spherical balls or beads. Another advantage is that it eliminates precision drilling of a blind hole to a precise depth. Still another advantage of the headed pin and through hole arrangement is that the diameter and height of the raised hemispherical surface will be consistent and accurate and will not vary as sometimes happens with spherical balls or beads due to differences between the diameter of the ball or bead and the diameter of the blind hole.

FIGS. 5 and 7 illustrate an alternate pin 20 having an elongate body or shank portion 21 with opposed rounded ends 22. The rounded-end pin 20 is approximately 0.059" in diameter and has a length approximately ¹⁄₃₂" (0.0313") longer than the thickness 14 of the sign plate 11. For example, if the plate 11 is ⅛" thick, the length of the pin 20 may be ⁵⁄₃₂". Should the bottom end of the pin 20 protrude beneath the bottom of the back surface 13, it may be ground down to be flush with the back surface. If the holes are not drilled completely through the sign plate, the length of the pin would be approximately ¹⁄₃₂" (0.0313") longer than the depth of the holes.

The method of drilling the holes for the rounded-end pins 20 is the same as previously described except that the diameter of the holes 15 would be approximately the same or slightly smaller than the diameter of the body or shank portion 21 of the pin to provide a press fit or friction fit. When installing the rounded-end pins 20 in through holes, the sign plate 11 is placed with its back surface 13 on a flat rigid stop plate 23. The pins 20 are placed above the holes 15 and pressed or forced axially downwardly frictionally engaging the body or shank portion 21 with the interior surface of the holes until the bottom rounded end 22 abuts the top surface of the stop plate 23. When properly installed each pin 20 forms a pattern of raised hemispherical dots corresponding to the pattern of the braille characters with a diameter of approximately 0.059" and a height above the flat surface of approximately ¹⁄₃₂" (0.0313").

Referring again to FIG. 2, the sign 10 may be provided with visually discernible conventional alphanumeric characters 24 corresponding to the braille characters described above. In the illustrated example, the numeral "25" is disposed above the braille characters corresponding to the numeral. The conventional alphanumeric characters 24 corresponding to the braille characters may be applied to the front surface 12 of the sign 10 by conventional sign making means and may be raised, embossed, printed, or adhered to the front surface.

While this invention has been described fully and completely with special emphasis upon preferred embodiments, it should be understood that within the scope of the appended claims the invention may be practiced otherwise than as specifically described herein.

What is claimed is:

1. A sign having tactilely discernible braille characters formed of raised hemispherical elements comprising:

a sign plate having a planar front surface, planar back surface, and a predetermined thickness;

a plurality of holes of predetermined diameter extending inwardly into said sign plate from said front surface arranged in a pattern corresponding to a braille character;

an elongate pin member in each of said holes having a predetermined length and diameter and having a hemispherically rounded end; and each said elongate pin member secured substantially along its length in a respective one of each of said holes with said hemispherically rounded end protruding from said respective hole a predetermined height above said sign plate front surface to form a tactile raised hemispherical element of said braille character.

2. The sign according to claim 1 wherein each said elongate pin member has a shank portion of a length slightly less than the depth of said holes and a hemispherically rounded head at one end of said shank portion having predetermined height and a diameter greater than said shank portion defining a flat radial shoulder therebetween; and each said shank portion is secured along its length in a respective one of each of said holes with said radial shoulder engaged on said sign plate front surface and said hemispherically rounded head protruding a predetermined height above said front surface to form said tactile raised hemispherical element of said braille character.

3. The sign according to claim 2 wherein each said elongate pin member shank portion is frictionally engaged along its length in a respective one of each of said holes.

4. The sign according to claim 2 wherein each said elongate pin member hemispherically rounded head is approximately 0.059" in diameter and has a height of approximately 0.0313".

5. The sign according to claim 1 wherein said plurality of holes are open-ended holes of predetermined diameter extending completely through said sign plate between said front and back surfaces arranged in a pattern corresponding to a braille character; and each said elongate pin member has a shank portion of a length approximately equal to said sign plate thickness and a hemispherically rounded head at one end of said shank portion having predetermined height and a diameter greater than said shank portion defining a flat radial shoulder therebetween, and each said shank portion is secured along its length in a respective one of each of said holes with said radial shoulder engaged on said sign plate front surface and said hemispherically rounded head protruding a predetermined height above said front surface to form said tactile raised hemispherical element of said braille character.

6. The sign according to claim 1 wherein each said elongate pin member has a length greater than the depth of said holes, a diameter slightly greater than the diameter of said holes, a hemispherically rounded top end, and a bottom end; and each said elongate pin member is frictionally engaged substantially along its length in a respective one of each of said holes and said hemispherically rounded end protrudes from said respective hole a predetermined height above said sign plate front surface.

7. The sign according to claim 1 wherein said plurality of holes are open-ended holes of predetermined diameter extending completely through said sign plate between said front and back surfaces arranged in a pattern corresponding to a braille character; and each said elongate pin member has a length greater than said sign plate thickness, a diameter slightly greater than the diameter of said holes, a hemispherically rounded top end, and a bottom end; and each said elongate pin member is frictionally engaged substantially along its length in a respective one of each of said holes and said hemispherically rounded end protrudes from said respective hole a predetermined height above said sign plate front surface.

8. The sign according to claim 1 wherein each said elongate pin member is approximately 0.059" in diameter and said hemispherically rounded end protrudes from said respective hole a height of approximately 0.0313 above said front surface to form said tactile raised hemispherical element of said braille character.

9. The sign according to claim 1 further comprising a visually discernible alphanumeric character on said front surface corresponding to said braille character formed by said tactile raised hemispherical elements.

10. A method of manufacturing a braille sign having tactilely discernible raised braille characters, comprising the steps of:

providing a plurality of elongate pin members of predetermined length and diameter and having a hemispherically rounded end;

providing a sign plate having a planar front and back surface and a predetermined thickness;

drilling a plurality of holes of predetermined diameter into said sign plate to extend inwardly from said front and surface in a pattern corresponding to a braille character to be formed on said front surface;

securing one of said elongate pin members in a respective one of each of said holes so that said pin member is secured substantially along its length in said respective hole and said hemispherically rounded end protrudes from said respective hole a predetermined height above said sign plate front surface to form a tactile raised hemispherical element of said braille characters.

11. The method according to claim 10 wherein each said elongate pin member has a shank portion of a length slightly less than the depth of said holes and a hemispherically rounded head at one end of said shank portion having a predetermined height and a diameter greater than said shank portion defining a flat radial shoulder therebetween; and said step of securing each said elongate pin member in each said respective hole comprises securing each said shank portion along its length in a respective one of each of said holes with said radial shoulder engaged on said front surface and said hemispherically rounded head protruding a predetermined height above said front surface to form said tactile raised hemispherical element of said braille characters.

12. The method according to claim 11 wherein each said elongate pin member shank portion has a diameter slightly greater than the diameter of said holes; and said step of securing each said elongate pin member in each said respective hole comprises forcing said shank portion axially into said respective hole to frictionally engage said shank portion along its length in said respective hole and engage said radial shoulder on said front surface so that said hemispherically rounded head protrudes a predetermined height above said front surface.

13. The method according to claim 10 wherein each said elongate pin member has a shank portion of a length approximately equal to said sign plate thickness and a hemispherically rounded head at one end of said shank portion having a predetermined height and a diameter greater than said shank portion defining a flat radial shoulder therebetween;

said step of drilling includes drilling a plurality of open-ended holes of predetermined diameter completely through said sign plate to extend between said front and back surfaces, and said step of securing each said elongate pin member in each said respective hole comprises securing each said shank portion along its length in a respective one of each of said holes with said radial shoulder engaged on said front surface and said hemispherically rounded head protruding a predetermined height above said front surface to form said tactile raised hemispherical element of said braille characters.

14. The method according to claim 10 wherein said elongate pin member has a length greater than the depth of said holes, a diameter slightly greater than the diameter of said holes, a hemispherically rounded top end, and a bottom end; and said step of securing each said elongate pin member in each said respective hole comprises forcing said pin member axially into said respective hole to frictionally engage said pin member substantially along its length in a respective one of each of said holes with said hemispherically rounded end protruding from said respective hole a predetermined height above said front surface.

15. The method according to claim 10 wherein said elongate pin member has a length greater than said sign plate thickness, a diameter slightly greater than the diameter of said holes, a hemispherically rounded top end, and a bottom end;

said step of drilling includes drilling a plurality of open-ended holes of predetermined diameter completely through said sign plate to extend between said front and back surfaces, and said step of securing each said elongate pin member in each said respective hole comprises forcing said pin member axially into said respective hole to frictionally engage said pin member substantially along its length in a respective one of each of said holes with said hemispherically rounded end protruding from said respective hole a predetermined height above said front surface.

16. The method according to claim 15 wherein said step of securing each said elongate pin member in each said respective hole comprises placing said sign plate back surface on a rigid flat stop surface; and forcing said pin member axially into said respective hole until said bottom end engages said rigid flat stop surface and said hemispherically rounded end protrudes from said respective hole a predetermined height above said front surface.

17. The method according to claim 10 including the step of placing a visually discernible alphanumeric character on said front surface corresponding to said braille character formed by said tactile raised hemispherical elements.

18. The method according to claim 10 wherein said step of drilling said plurality of holes comprises:

placing said sign plate beneath the drill bit of an automatic drilling machine controlled by a central processing unit connected with a keyboard, a display, and hardware for positioning said drilling machine, and containing a program for translating alphanumeric characters typed on said keyboard into input signals and for operating said hardware upon an instruction from the operator to position said drilling machine at points representing points within a braille cell, between adjacent cells, and vertical spacing between the cells of braille characters corresponding to typed alphanumeric characters;

typing alphanumeric characters on said keyboard which are to be formed as braille characters on said front surface, and instructing said program to operate said hardware; and thereafter said program sending output signals to said hardware to position said drilling machine at the coordinates of each of said points and lower said drill bit upon reaching each respective point to drill said holes in said sign plate.

* * * * *